US007121946B2

(12) United States Patent
Paul et al.

(10) Patent No.: US 7,121,946 B2
(45) Date of Patent: *Oct. 17, 2006

(54) REAL-TIME HEAD TRACKING SYSTEM FOR COMPUTER GAMES AND OTHER APPLICATIONS (75) Inventors: George V. Paul, Belleville, MI (US); Glenn J. Beach, Ypsilanti, MI (US); Charles J. Cohen, Ann Arbor, MI (US); Charles J. Jacobus, Ann Arbor, MI (US)

(73) Assignee: Cybernet Systems Corporation, Ann Arbor, MI (US)

(*) Notice: Subject to any disclaimer, the term of this patent is extended or adjusted under 35 U.S.C. 154(b) by 666 days.

This patent is subject to a terminal disclaimer.

(21) Appl. No.: 09/896,150

(22) Filed: Jun. 29, 2001

(65) Prior Publication Data

US 2002/0037770 A1 Mar. 28, 2002

Related U.S. Application Data (63) Continuation-in-part of application No. 09/798,594, filed on Mar. 2, 2001, which is a continuation-in-part of application No. 09/371,460, filed on Aug. 10, 1999, now Pat. No. 6,681,031.

(60) Provisional application No. 60/214,991, filed on Jun. 29, 2000, provisional application No. 60/096,126, filed on Aug. 10, 1998.

(51) Int. Cl.
*A63F 13/10* (2006.01)

(52) U.S. Cl. ...................................................... 463/36

(58) Field of Classification Search ................ 463/1, 463/30–34, 36, 42, 48–49; 701/300, 302; 706/17–18, 21, 24, 62; 345/418–419, 429–431, 345/112, 121, 141, 326–327, 501, 199, 22, 345/949–954, 959; 382/103, 236, 226, 276; 348/42, 51, 169; 600/587–595
See application file for complete search history.

(56) References Cited

U.S. PATENT DOCUMENTS 5,454,043 A * 9/1995 Freeman ..................... 382/168

(Continued)

OTHER PUBLICATIONS

Birchfield,S. "Elliptical Head Tracking Using Intensity Gradients and Color Histogram," Proceedings of the IEEE Conference on Computer Vision and Pattern Recognition. Santa Barbara, California, pp. 232-237, Jun. 1998.

(Continued)

*Primary Examiner*—Scott Jones
(74) *Attorney, Agent, or Firm*—Gifford, Krass, Groh, Sprinkle, Anderson & Citkowski, PC (57) ABSTRACT A real-time computer vision system tracks the head of a computer user to implement real-time control of games or other applications. The imaging hardware includes a color camera, frame grabber, and processor. The software consists of the low-level image grabbing software and a tracking algorithm. The system tracks objects based on the color, motion and/or shape of the object in the image. A color matching function is used to compute three measures of the target's probable location based on the target color, shape and motion. The method then computes the most probable location of the target using a weighting technique. Once the system is running, a graphical user interface displays the live image from the color camera on the computer screen. The operator can then use the mouse to select a target for tracking. The system will then keep track of the moving target in the scene in real-time.

12 Claims, 5 Drawing Sheets

U.S. PATENT DOCUMENTS

| | | | |
|---|---|---|---|
| 5,875,257 A * | 2/1999 | Marrin et al. | 382/107 |
| 5,878,151 A | 3/1999 | Tang et al. | 382/103 |
| 5,912,980 A | 6/1999 | Hunke | 382/103 |
| 5,973,732 A | 10/1999 | Guthrie | 348/169 |
| 6,002,428 A | 12/1999 | Matsumura et al. | 348/169 |
| 6,009,210 A | 12/1999 | Kang | 382/276 |
| 6,014,167 A | 1/2000 | Suito et al. | 348/169 |
| 6,031,568 A | 2/2000 | Wakitani | 348/169 |
| 6,035,053 A * | 3/2000 | Yoshioka et al. | 382/104 |
| 6,035,067 A | 3/2000 | Ponticos | 382/226 |
| 6,075,557 A | 6/2000 | Holliman et al. | 348/51 |
| 6,130,964 A | 10/2000 | Marques et al. | 382/236 |
| 6,163,336 A | 12/2000 | Richards | 348/42 |
| 6,173,066 B1 | 1/2001 | Peurach et al. | 382/103 |
| 6,188,777 B1 | 2/2001 | Darrell et al. | 382/103 |
| 6,272,231 B1 * | 8/2001 | Maurer et al. | 382/103 |
| 6,301,370 B1 * | 10/2001 | Steffens et al. | 382/103 |
| 6,335,977 B1 * | 1/2002 | Kage | 382/107 |
| 2001/0008561 A1 * | 7/2001 | Paul et al. | 382/103 |
| 2005/0008193 A1 * | 1/2005 | Toyama | 382/103 |

OTHER PUBLICATIONS

Horn, B. K. P. "Robot Vision," The MIT Press, Cambridge, Massachusetts, 1986.

* cited by examiner

```
Given new image and the estimated target center as rc, cc and old target shape
begin
    for i=rc-rs/2 to i=rc+rs/2
        for j=cc-cs/2 to j=cc+cs/2
            RGB = pixel(i,j)
            c = FindColorMatch(RGB)
            if c>0
                cr = c*i
                cc = c*j
                if this pixel lies on the previous shape template
                    sr = c*i
                    sc = c*j
                    s = c;
                else pixel shows movement
                    mr = c*i
                    mc = c*j
                    m = c;
                endif
                mark this pixel in the next shape template
                Nc = Nc+c
                Ns = Ns+s
                Nm = Nm+m
            else
                unmark this pixel in the next shape template
            endif
        endfor
    endfor cr = cr/Nc, cc = cc/Nc
    sr = or/Ns, sc = sc/Ns
    mr = mr/Nm, mc = mc/Nm compute new target center as a weighted average
    newr = cr*cw + sr*sw + mr*mw
    newc = cc*cw + sc*sw + mc*mw
    velr = (newr-rc)/t
    velc = (newc-cc)/t
```

REAL-TIME HEAD TRACKING SYSTEM FOR COMPUTER GAMES AND OTHER APPLICATIONS

REFERENCE TO PRIOR APPLICATIONS

This application claims priority of U.S. provisional application Ser. No. 60/214,991, filed Jun. 29, 2000, and is a continuation-in-part of U.S. patent application Ser. No. 09/798,594, filed Mar. 2, 2001, which is a continuation-in-part of U.S. patent application Ser. No. 09/371,460, filed Aug. 10, 1999, now U.S. Pat. No. 6,681,031 which claims priority from U.S. provisional application Ser. No. 60/096,126, filed Aug. 10, 1998. The entire contents of each application is incorporated herein by reference.

FIELD OF THE INVENTION

This invention relates generally to computer vision systems and, in particular, to a real-time head tracking system and method for use in conjunction with computer games and other control applications.

BACKGROUND OF THE INVENTION

Current imaging systems can convert live scenes into a sequence of digital images which can be processed to track any object in the scene from frame to frame. The techniques used for tracking are numerous. Most of the currently available systems use some characteristic of the subset of the image containing the target to search and locate the target in the following image. The quality and speed of the tracking system depends on the implementation of this search and locate idea.

Most tracking systems use correlation of a sample subimage representing the object with parts of the current image. The correlation values are computed in a search area around an estimated location of the object. The correlation operation is computationally expensive and usually is performed using specialized hardware.

Another set of tracking methods uses a 3D model of the object being tracked. In these methods, the model is mapped into the target location based on the location and illumination parameters. The disadvantage of such model based tracking methods is the relatively high amount of computation for the mapping from the 3D model to the image. The tracking systems that avoid the correlation or model matching approaches, use characteristics of the object's appearance or motion in estimating the location of the object in the current image. These techniques are faster than correlation methods but are less robust to changing shape and temporary occlusion by similarly colored objects in the scene.

The work by Darell et al. in U.S. Pat. No. 6,188,777 uses stereo cameras and involves three modules which compute the range of the tracked object, segments the object based on color and does pattern classification. Each of the modules involved places a large computational load on the computer. The method of Peurach et. al. in U.S. Pat. No. 6,173,066 uses a 3D object model database and projection geometry to find the pose of the object in the 2D camera image. The pose determination and tracking involves searching in a multi-dimensional object pose space. The computation involved is very high.

The method of Richards in U.S. Pat. No. 6,163,336 uses special cameras and infrared lighting and a specialized background. The method of Marques et. al. in U.S. Pat. No. 6,130,964 involves a layered segmentation of the object in the scene based on a homogenuity measure. The method also involves a high amount of computation. The template matching method proposed by Holliman et. al. in U.S. Pat. No. 6,075,557 which tracks subimages in the larger camera image involves search and correlation means relatively large amounts of computation. The method of Ponticos in U.S. Pat. No. 6,035,067 uses segmentation of the image based on pixel color. The system of Wakitani in U.S. Pat. No. 6,031,568 uses hardware to do template matching of the target. The method is computationally expensive correlation is done via hardware.

The tracking proposed in this method by Suito et. al. in U.S. Pat. No. 6,014,167 relies mostly on the difference image between successive frames to detect motion and then tracks moving pixels using color. This work uses correlation and searches in a multi dimensional space to compute the object's 3D position and orientation. The amount of computation involved is immense.

The proposed method of Matsumura et. al. in U.S. Pat. No. 6,002,428 does color matching to track the target. The method of Guthrie in U.S. Pat. No. 5,973,732 uses differencing and blob analysis. The method of Hunke in U.S. Pat. No. 5,912,980 uses color matching as opposed to shape. The method of Tang et. al in U.S. Pat. No. 5,878,151 uses correlation to track subimages in the image.

SUMMARY OF THE INVENTION

This invention resides in a real-time computer vision system capable of tracking moving objects in a scene. Unlike current search and locate algorithms, the subject algorithm uses a target location technique which does not involve search. The system tracks objects based on the color, motion and shape of the object in the image. The tracking algorithm uses a unique color matching technique which uses minimal computation. This color matching function is used to compute three measures of the target's probable location based on the target color, shape and motion. It then computes the most probable location of the target using a weighting technique. These techniques make the invention very computationally efficient also makes it robust to noise, occlusion and rapid motion of the target.

The imaging hardware of the real-time object tracking system includes a color camera, a frame grabber, and a personal computer. The software includes low-level image grabbing software and the tracking algorithm. Once the application is running, a graphical user interface displays the live image from the color camera on the computer screen. The operator can then use the mouse to click on the hand in the image to select a target for tracking. The system will then keep track of the moving target in the scene in real-time. As such, the system finds utility in a wide range of applications, including head tracking for game control.

DETAILED DESCRIPTION OF THE INVENTION

Figure 1:
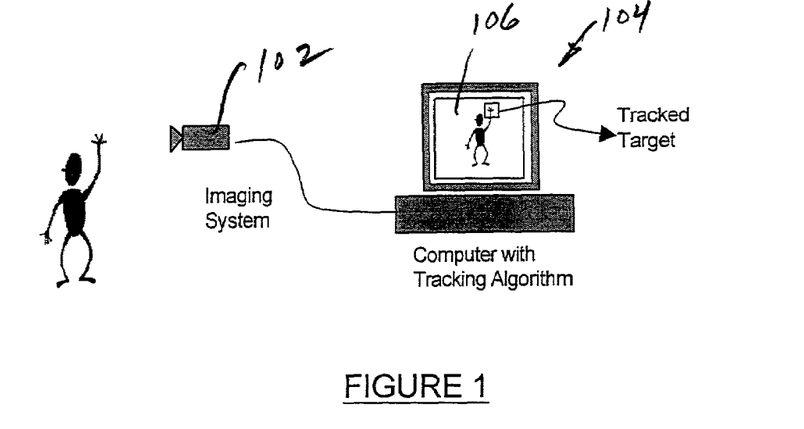
FIG. 1 is a simplified drawing of an imaging system and computer with tracking algorithm according to the invention.

A schematic of the system is shown in FIG. 1. The imaging hardware includes a color camera 102 and a digitizer. The sequence of images of the scene is then fed to a computer 104 which runs tracking software according to the invention. The tracking algorithm is independent of the imaging system hardware. The tracking system has a graphical user interface (GUI) to initialize the target and show the tracking result on the screen 106.

The GUI for the ROTS displays a live color image from the camera on the computer screen. The user can initialize the target manually or automatically. Once initialized, the ROTS will then track the target in real-time.

Figure 2:
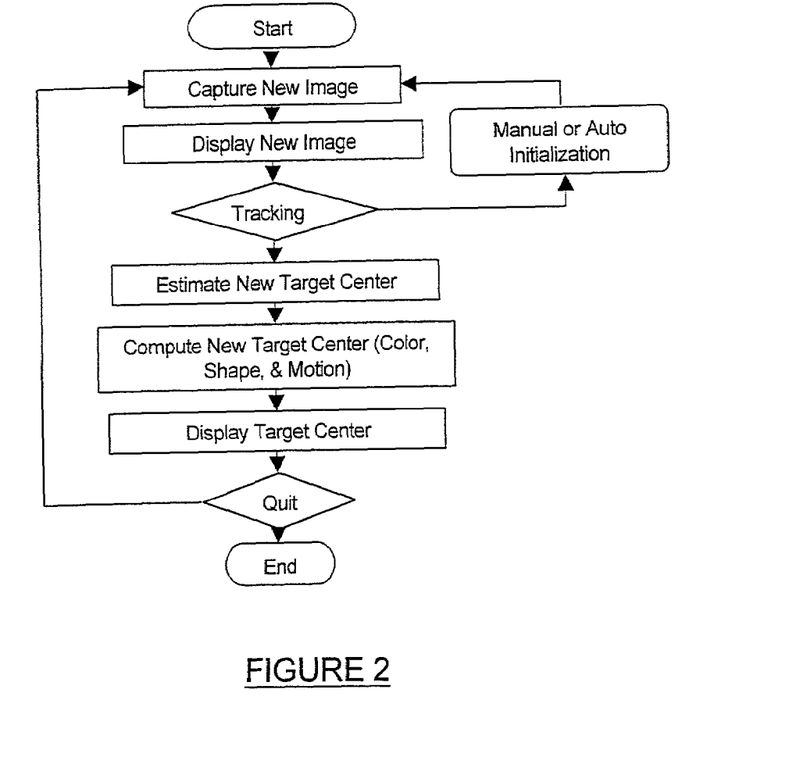
FIG. 2 is a flow chart illustrating important steps of the tracking algorithm.

The flow chart of the tracking algorithm is shown in FIG. 2. The program captures live images from the camera and displays them on the screen. It then allows the user to select the target manually using the mouse or automatically by moving the target to a predetermined position in the scene. At the point of initialization, the color, the shape and location of the target are computed and stored. Once the target is initialized, we compute an estimate of the target location using target dynamics. We then compute the actual location using the color, shape and motion information with respect to a region centered at the estimated location.

Figure 3:
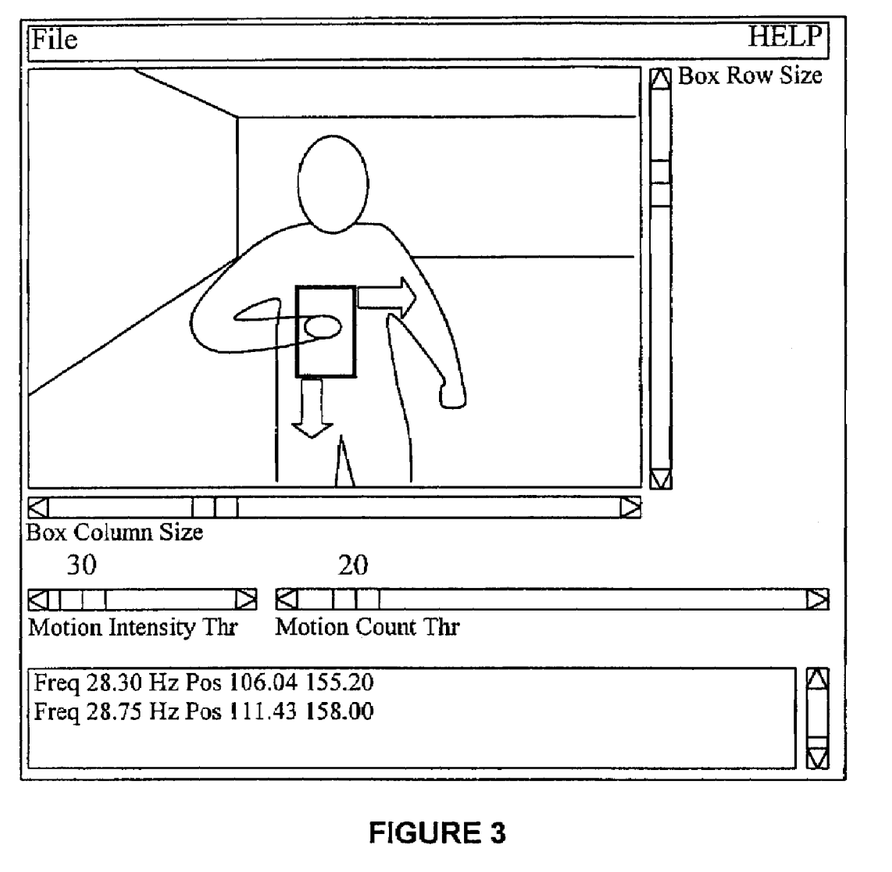
FIG. 3 is a drawing of a preferred graphical user interface for use with the system of the invention.
Figure 4:
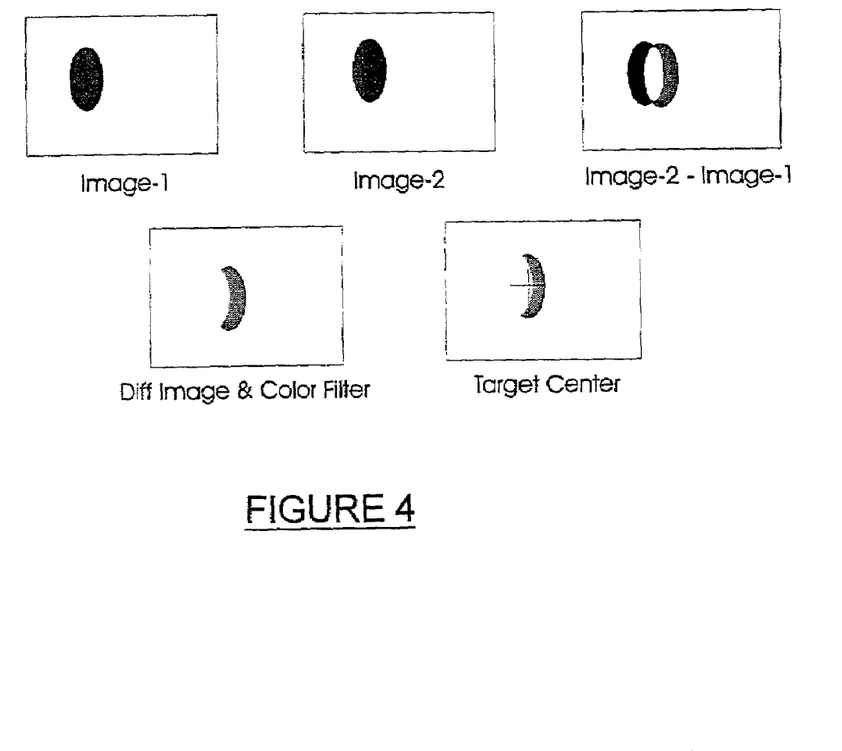
FIG. 4 is a series of drawings which show the use of color to track a target or feature.

The input to the ROTS is a sequence of color images, preferably in the standard RGB24 format. Hence, the hardware can be a camera with a image grabbing board or a USB camera connected to the USB port of the computer. A preferred GUI is shown in FIG. 3.

Tracking using Color, Shape and Motion

Once the user clicks on the target in the image, we compute the median color of a small region around this point in the image. This will be the color of the target region being tracked in the scene until it is reinitialized. We also store the shape of the target by segmenting the object using its color. Once tracking begins, we compute the center of the target region in the image using a combination of three aspects of the target. The three aspects are the color, the shape and the motion. This results in a very robust tracking system which can withstand a variety of noise, occlusion and rapid motion.

Color Matching

The color of a pixel in a color image is determined by the values of the Red, Green and Blue bytes corresponding to the pixel in the image buffer. This color value will form a point in the three-dimensional RGB color space. When we compute the color of the target, we assume that the target is fairly evenly colored and the illumination stays relatively the same. The color of the target is then the median RGB value of a sample set of pixels constituting the target. When the target moves and the illumination changes the color of the target is likely to change. We use a computationally efficient color matching function which allows us to compute whether a pixel color matches the target color within limits.

Figure 5:
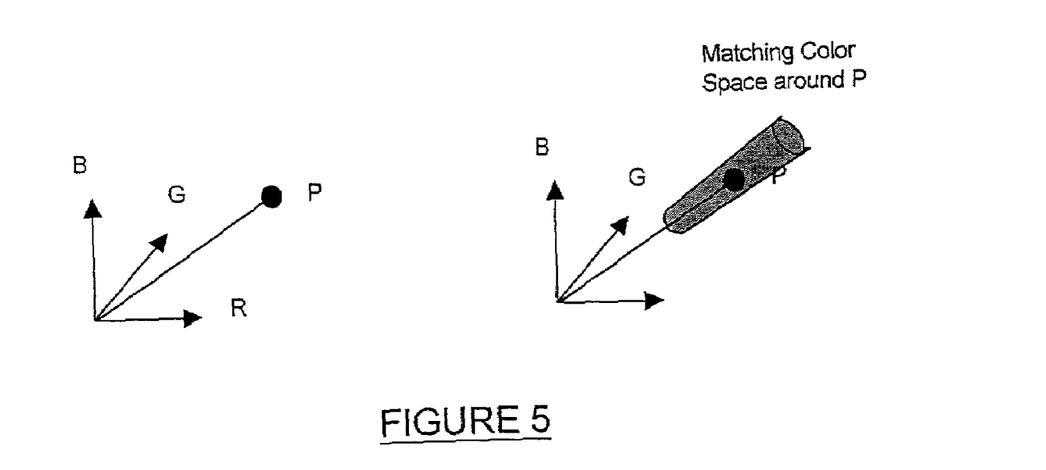
FIG. 5 illustrates the use a truncated cone to account for slight variations in color.

When the illumination on the target changes, the intensity of the color will change. This will appear as a movement along the RGB color vector as shown in FIG. 5. In order to account for slight variations in the color, we further allow the point in color space to lie within a small-truncated cone as shown in FIG. 5. The two thresholds will decide the shape of the matching color cone. A threshold on the angle of the color cone and another threshold on the minimum length of the color vector decides the matching color space. Thus, any pixel whose color lies within the truncated cone in color space will be considered as having the same color as the target.

Given a colored pixel, we quantitatively define the match between it and a reference color pixel as follows. Let (R, G, B) be the values of the RGB vector of the first pixel. Let $(R_r, G_r, B_r)$ be the RGB vector for the reference color.

$$d = RR_r + GG_r + BB_r$$
$$m_r = R_r^2 + G_r^2 + B_r^2$$
$$m = R^2 + G^2 + B^2$$
$$d_m = \frac{d}{m_r}$$
$$d_a = \frac{d}{\sqrt{m_r m}}$$
$$ColorMatch(R, G, B) = \begin{cases} d_m d_a & \text{if } ((d_m^l < d_m < d_m^h) \& (d_a^l < d_a < d_a^h)) \\ 0 & \text{otherwise} \end{cases}$$

The value of $d_m$ is related to the length of the projection of the given color vector onto the reference vector. The value of $d_a$ is related to the angle between the two vectors. If we set two threshold bands for $d_m$ and $d_a$, we can filter out those pixels which lie within the truncated cone around the reference vector. Their product will indicate the goodness of the match. The parameters $d_m$ and $d_a$ are chosen to be computationally simple to implement which becomes important when all the pixels in a region have to be compared to the reference color in each new image.

Position Using Color

Once we have the target color and a color matching algorithm, we can find all the pixels in any given region of the image which match the target color. We use the quantitative measure of the match to find a weighted average of these pixel positions. This gives us the most likely center of the target based on color alone. If (i, j) are the row and column coordinates of the pixel $P_c(i,j)$, then for a given rectangular region the most likely target center based on color alone will be given as follows.

$$P_c(i, j, t) = ColorMatch(R(i, j, t), G(i, j, t), B(i, j, t))$$

$$Center_{color} = \begin{bmatrix} r_c \\ c_c \end{bmatrix} = \begin{bmatrix} \frac{\sum_{1}^{I*J} P_c(i, j, t) * i}{\sum_{1}^{I*J} P_c(i, j, t)} \\ \frac{\sum_{1}^{I*J} P_c(i, j, t) * j}{\sum_{1}^{I*J} P_c(i, j, t)} \end{bmatrix}$$

Note that the centroid of the target is computed as a weighted sum. The weights are the color matching measure of the pixel. This weighting of the pixel contrasts with the usual practice of weighting all matching pixels the same makes our algorithm less prone to creep. We also keep track of the sum of the matched pixel weights. If this sum is less than a threshold we assume that the target is not in the region.

Shape Matching

Once the target is initialized, we compute a two-dimensional template of the target. We use this dynamic template which is updated every frame to measure the closeness of pixels at the estimated location to the target shape. Given the color of the object being tracked and the color matching function we segment all the pixels in a region around the estimated location. The resulting segmented image is the shape of the object and forms the template. With each new image of the scene, the template of the target in the previous frame is used to compute the new center of the target in the new image. The advantage of using templates instead of any assumed shape such as an ellipse is that the tracking and localization of the target is much more robust to shape change and hence more accurate.

$$P(i, j, t) = ColorMatch\ (R(i, j, t), G(i, j, t), B(i, j, t))\ \text{for time} = t$$

$$M(i, j, t-1) = \begin{cases} 1 & \text{if } (P(i, j, t-1) > 0) \\ 0 & \text{otherwise} \end{cases}$$

$$S(i, j, t) = P(i, j, t)M(i, j, t-1)$$

$$Center_{shape} = \begin{bmatrix} r_s \\ c_s \end{bmatrix} = \begin{bmatrix} \dfrac{\sum_{1}^{I*J} S(i, j, t)*i}{\sum_{1}^{I*J} S(i, j, t)} \\ \dfrac{\sum_{1}^{I*J} S(i, j, t)*j}{\sum_{1}^{I*J} S(i, j, t)} \end{bmatrix}$$

The closeness of the shape is a summation of the product of the pixel color match $P(i,j)$ with the target template $M(i,j)$. Note again that the color matching measure is used to weight the shape measure. This makes our algorithm robust to creep. Once the region S is obtained, we can compute the centroid of S. This is the probable location of the target based solely on the shape of the target.

Motion Detection

The algorithm checks for motion in a region near the estimated target position using a motion detecting function. This function computes the difference between the current image and the previous image, which is stored in memory. If motion has occurred, there will be sufficient change in the intensities in the region. The motion detection function will trigger if a sufficient number of pixels change intensity by a certain threshold value. This detection phase eliminates unnecessary computation when the object is stationary.

Position Using Motion

If the motion detection function detects motion, the next step is to locate the target. This is done using the difference image and the target color. When an object moves between frames in a relatively stationary background, the color of the pixels changes between frames near the target (unless the target and the background are of the same color). We compute the color change between frames for pixels near the target location. The pixels whose color changes beyond a threshold make up the difference image. Note that the difference image will have areas, which are complementary. The pixels where the object used to be will complement those pixels where the object is at now. If we separate these pixels using the color of the target, we can compute the new location of the target. The set of pixels in the difference image, which has the color of the target in the new image, will correspond to the leading edge of the target in the new image. If we assume that the shape of the target changes negligibly between frames, we can use the shape of the target from the previous image to compute the position of the center of the target from this difference image.

Let D be the difference sub-image between the previous target and the estimated target location in the new image. If we threshold the difference image, we end up with a binary image. If we intersect this binary image D with the shape of the target in the new image M we get the moving edge of the target as the region V. We then weight this region by the color matching measure P.

$$D(i, j, t) = \begin{cases} 1 & \text{if } |P(i, j, t) - P(i, j, t-1)| > \tau_m \\ 0 & \text{otherwise} \end{cases}$$

$$M(i, j, t) = \begin{cases} 1 & \text{if } (P(i, j, t) > \tau_c) \\ 0 & \text{otherwise} \end{cases}$$

$$V(i, j, t) = (D(i, j, t) \cap M(i, j, t)) * P(i, j, t)$$

$$Center_{motion} = \begin{bmatrix} r_m \\ c_m \end{bmatrix} = \begin{bmatrix} \dfrac{\sum_{1}^{I*J} V(i, j, t)*i}{\sum_{1}^{I*J} V(i, j, t)} \\ \dfrac{\sum_{1}^{I*J} V(i, j, t)*j}{\sum_{1}^{I*J} V(i, j, t)} \end{bmatrix}$$

The centroid of the region V is then computed as the probable location of the target based on motion alone. This weighting of the intersection region by the color matching measure makes our tracking less prone to jitter.

In a physically implemented system, the image capture board is capable of providing us with a 480×640-pixel color image at 30 frames per second. Processing such a large image will slow down the program. Fortunately, the nature of the tracking task is such that, only a fraction of the image is of interest. This region called the window of interest lies around the estimated position of the target in the new image. We can compute the location of the target in the new image from the location of the target in the previous image and its dynamics. We have used prediction based on velocity computation between frames. This technique is able to keep track of the target even when the target moves rapidly. We have found that the window of interest is typically one one-hundredth the area of the original image. This speeds up the computation of the new target location considerably.

Tracking Algorithm

Figure 6:
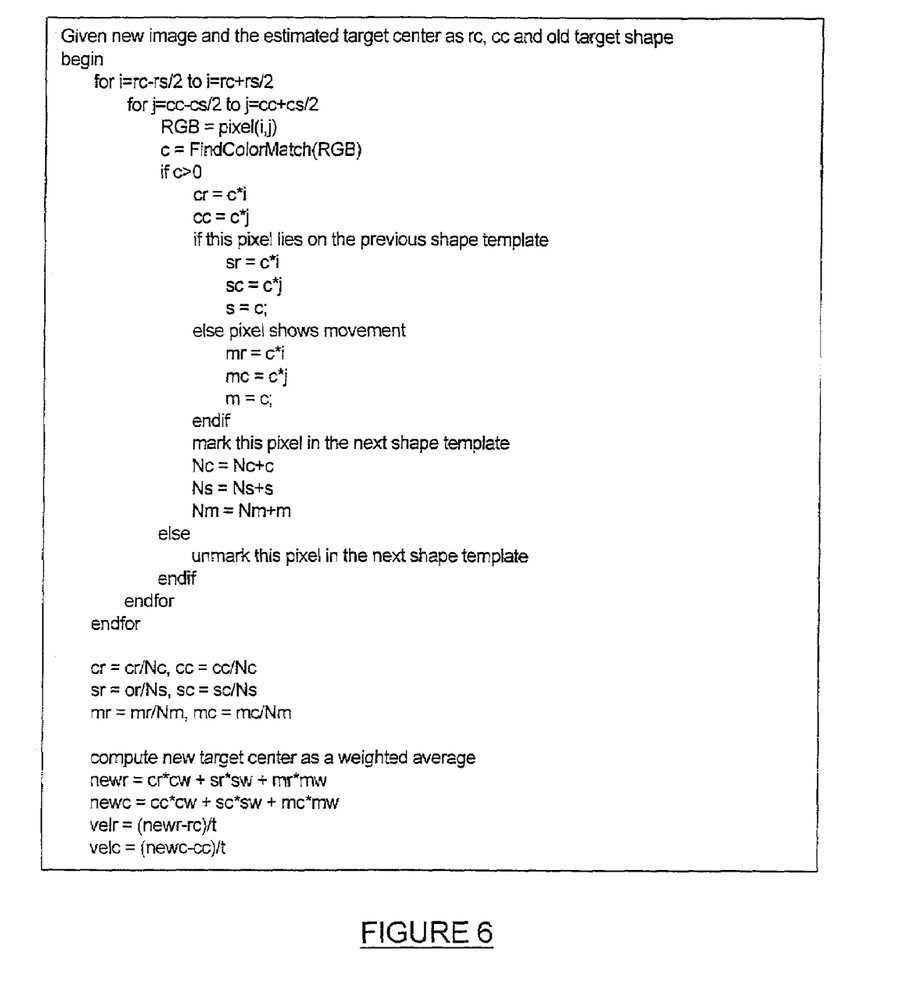
FIG. 6 illustrates steps of a method according to the invention written in pseudocode.

If we are given an estimated target location as (rc, cc) in the new image and the size of the area to be searched is given by (rs, cs), then the algorithm can be written in pseudo code as shown in FIG. 6.

Note that the color matching weight c is being used to weight all the three centers. This weighting makes this algorithm smoother and more robust. The velocity computed at the end of the tracking algorithm is used to compute the estimated position of the target in the next frame.

Extensions of the system are possible in accordance with the described algorithm herein. One is a tracking system which can track multiple targets in the same image. Another uses the tracking in two stereo images to track the target in 3D.

As a further extension, the system may be used to track a person's head for use in video games or other real-time computer vision applications. As with the other embodiments described herein, such tracking may be based on color, motion and/or shape of the object in the image. In this particular implementation, the system preferably tracks a person's head, such that when the person moves their head slightly to the left or right, the game responds according (such as looking to the left or right around the corner).

If the person moves their head to a greater degree, a preferred response would be that the person followed by the tracker "jogs" quickly to the left or right. Similar responses would occur if the person moves their head up or down, or looks in a specific direction.

As with the other embodiments described herein, the real-time object tracking system (ROTS) in this case preferably uses the color of the object, its shape and its motion to localize it in the scene. The hardware also includes a color camera, a frame grabber, and a suitable computer or workstation. The software includes the low-level image grabbing software and the tracking algorithm.

Figure 7:
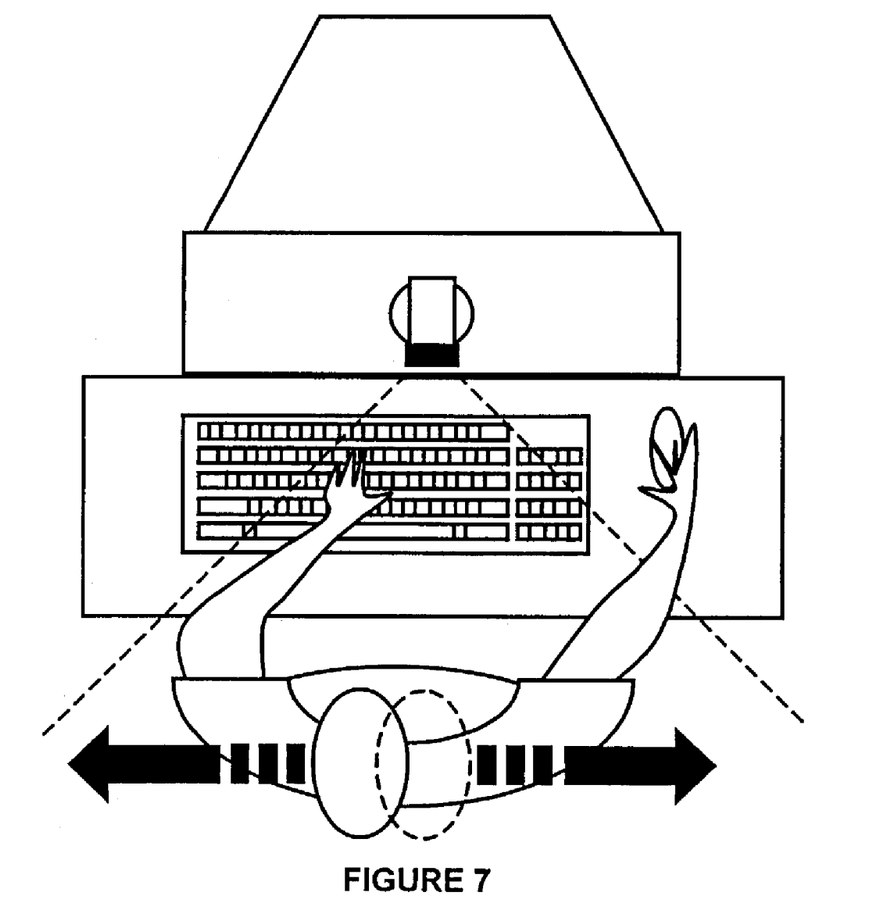
FIG. 7 is a drawing which depicts a computer game head-tracking application according to the invention.

The computer game (or games) and camera are installed on the computer, and the camera oriented to face the person as shown in FIG. 7. The software is installed on the computer and started. An interface appears, which includes a GUI (Generic User Interface) and an image from the camera.

Once the ROTS is running, the graphical user interface displays the live image from the color camera on the computer screen. The operator can then use the mouse to click on the head in the image to select a target for tracking. The system will then keep track of the moving target in the scene in real-time. The system is also capable of automatically locking onto the target if it moves in a periodic motion. This eliminates the need for manual clicking on the target. Since the algorithm uses the color, shape and motion of the target, the tracker is robust to noise and rapid motion of the target.

The GUI allows the user to perform the following operations:
 a. To initiate head tracking by having the person 'click' the mouse icon on their own head. Note that they can click on any object in the camera's field of view, and that object will be tracked. This object could be a head, hand, coffee mug, or other object;
 b. To adjust the left, right, up, down motion boundaries;
 c. To adjust the velocity threshold for motion;
 d. To designate desired keystrokes to initiated head motions (left, right, up, down); and
 e. To initiate the playing of the game.

During the game play, if the user's head exceeds the threshold above the motion velocity, the system will initiate the corresponding key stroke or set of key strokes as commands into the game. The user can turn off and on the initiating of head motion commands; for example, by hitting the num-lock or other non-game related key. The system can also emulate joystick inputs, or any other type of input in the same manner that keystrokes are emulated.

We claim:

1. A method controlling a computer game, comprising the steps of:
 imaging a sequence of scenes including the head of a user of the computer;
 comparing visual characteristics from a portion of a scene to a center of said portion of a scene to determine movement of the user's head within the scene wherein at least one of the visual characteristics is color;
 providing a weighted average of color to compute the location of the user's head based upon color alone; and
 controlling the game in accordance with the movements.

2. The method of claim 1, wherein the visual characteristics include shape or location.

3. The method of claim 2, wherein the visual characteristics include a combination of static and dynamic characteristics.

4. The method of claim 3, further including the step of modeling of the dynamic characteristics to yield an estimate of head position.

5. The method of claim 1, further including the step of initiating head tracking through a graphical user interface.

6. The method of claim 5, wherein the graphical user interface provides a bounding box displayed in a screen to assist in targeting the user's head.

7. The method of claim 2, further comprising the step of enabling a match in color despite the differences arising from lighting and shadows.

8. The method of claim 2, further comprising the step of enabling a match in color within a threshold of hue.

9. The method of claim 1, wherein the step of comparing the visual characteristics includes a comparison of pixels from scene to scene.

10. The method of claim 1, further including the step of determining if the user's head was moved outside of the scene.

11. The method of claim 1, further including the step of segmenting a region defined by a predetermined closeness of color as an estimate of target shape.

12. The method of claim 1, further including the step of continuing to track the user's head when moving in front of or behind a similarly colored object in the scene.

* * * * *